(12) United States Patent
Lu

(10) Patent No.: US 7,268,520 B2
(45) Date of Patent: Sep. 11, 2007

(54) SENSE AMPLIFIER FOR USE WITH WAKE-UP CHARGING CURRENT

(75) Inventor: Chun Lu, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/102,135

(22) Filed: Apr. 8, 2005

(65) Prior Publication Data

US 2006/0226813 A1    Oct. 12, 2006

(51) Int. Cl.
*H02J 7/00* (2006.01)
*H02J 7/04* (2006.01)

(52) U.S. Cl. .................. 320/134; 320/140; 320/141

(58) Field of Classification Search ................ 320/134, 320/140, 141
See application file for complete search history.

(56) References Cited

U.S. PATENT DOCUMENTS

| | | | |
|---|---|---|---|
| 4,621,313 A | 11/1986 | Kiteley | 363/49 |
| 5,623,197 A | 4/1997 | Roseman et al. | 320/134 |
| 5,698,964 A | 12/1997 | Kates et al. | 320/164 |
| 5,723,970 A | 3/1998 | Bell | 320/140 |
| 5,912,549 A | 6/1999 | Farrington et al. | 323/207 |
| 5,920,475 A | 7/1999 | Boylan et al. | 363/127 |
| 6,184,660 B1 | 2/2001 | Hatular | 320/141 |
| 6,351,110 B1 | 2/2002 | Pappalardo et al. | 323/285 |
| 6,369,561 B1 | 4/2002 | Pappalardo et al. | 323/285 |
| 6,396,716 B1 | 5/2002 | Liu et al. | 363/17 |
| 6,498,461 B1 | 12/2002 | Bucur | 320/145 |
| 6,611,129 B2 | 8/2003 | Bucur | 320/145 |

*Primary Examiner*—Karl Easthom
*Assistant Examiner*—Alexis Boateng
(74) *Attorney, Agent, or Firm*—Grossman, Tucker, Perreault & Pfleger PLLC

(57) ABSTRACT

A sense amplifier adapted to amplify a voltage signal representative of a charging current provided to a rechargeable battery. The sense amplifier may include a p-type input sense amplifier and an n-type input sense amplifier, The p-type input sense amplifier may be enabled and the n-type input sense amplifier may be disabled if a battery voltage level of the rechargeable battery is less than an under voltage threshold level. The p-type input sense amplifier may be disabled and the n-type input sense amplifier may be enabled if the battery voltage level is greater than or equal to the under voltage threshold level. A related method and an electronic device having a sense amplifier consistent with an embodiment are also provided.

3 Claims, 5 Drawing Sheets

SENSE AMPLIFIER FOR USE WITH WAKE-UP CHARGING CURRENT

FIELD

This disclosure relates to sense amplifiers and in particular to sense amplifiers for use with a wake-up charging current for rechargeable batteries.

BACKGROUND

A variety of electronic devices such as portable computers, portable phones, personal digital assistants, and other portable and non-portable electronic devices may utilize a rechargeable battery. In some instances, the rechargeable battery may be deeply discharged. A deeply discharged battery may be defined as a battery having a battery voltage level less than an under voltage threshold level where the value of the under voltage threshold level may vary with battery type and manufacturer. To avoid stressing such a deeply discharged battery at the start of a battery charging process, a relatively small "wake-up" current may be provided to the deeply discharged battery. The wake-up current may be provided to the battery until the battery voltage level reaches the under voltage threshold level. At that time, the rechargeable battery may no longer be considered a deeply discharged battery and a larger charging current may safely be provided to the battery.

A DC to DC converter and its associated controller may regulate the charging conditions for the rechargeable battery. In order to provide a signal representative of the charging current to the controller of the DC to DC converter, a sensor may be coupled to the path providing a charging current to the rechargeable battery. A sense amplifier may also be utilized in conjunction with the sensor to amplify the signal provided by the sensor. However, a conventional sense amplifier utilizes only an n-type input sense amplifier that will not work when the rechargeable battery is deeply discharged and the wake-up charging current is required. This is because the voltage of the rechargeable battery drops to a value low enough to be out of the common mode voltage of the n-type input sense amplifier.

Since the n-input type sense amplifier will not work when the rechargeable battery is deeply discharged, the conventional sense amplifier does not provide any charging current signal representative of the wake-up charging current to the controller of the DC to DC converter. Rather, upon sensing a deeply discharged battery, the controller disregards any signal from the sense amplifier and rather provides a particular control signal over a particular range to control the charging current when the battery is deeply discharged. For example, the controller may provide a pulse width modulated (PWM) signal to the DC to DC controller having a duty cycle between 0 and a certain value. However, such a conventional method results in a wake-up charging current that may have an inaccurate mean value, may have a large peak to peak ripple current, and may suffer from noise.

Accordingly, there is a need for a sense amplifier that may be utilized even when the rechargeable battery is deeply discharged.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
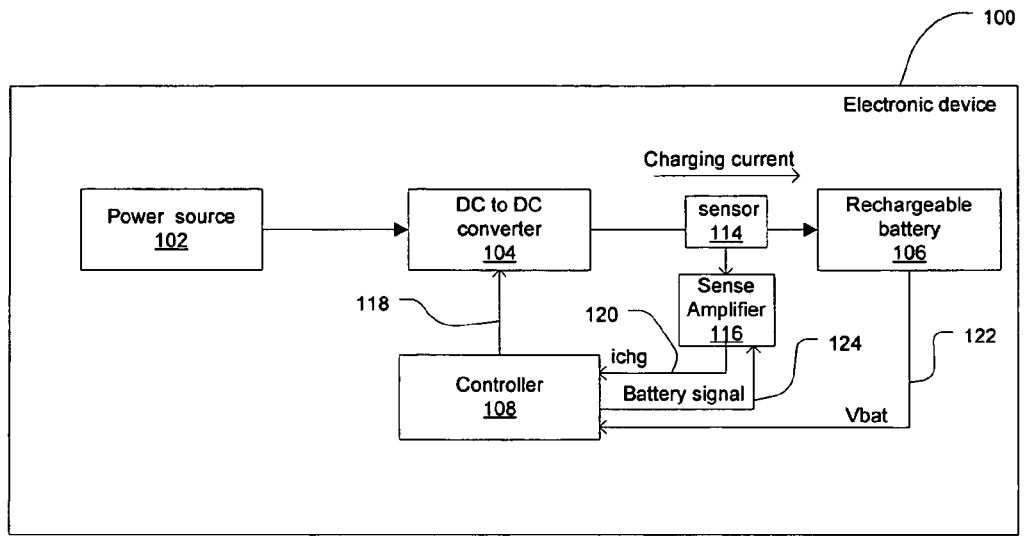
FIG. 1 is a diagram of an electronic device.

FIG. 1 illustrates a block diagram of an electronic device 100. The electronic device 100 may be any variety of devices such as a laptop computer, portable phone, personal digital assistant, digital camera, etc. having a rechargeable battery 106. The rechargeable battery 106 may be any variety of battery types such as lithium ion, lithium-polymer, nickel-cadmium, nickel-metal hydride, etc. The rechargeable battery 106 may have a single cell or multiple cells. The electronic device 100 may also include a power source 102, a DC to DC converter 104, a sensor 114, a sense amplifier 116 consistent with an embodiment, and a controller 108. The power source 102 may provide an input DC voltage to the DC to DC converter. The power source 102 may include any variety of sources such as an AC/DC adapter or a "cigarette" type DC to DC adapter. Although illustrated as being internal to the electronic device 100, the power source 102 may also be external to the electronic device 100.

The DC to DC converter 104 may be a variety of converters to accept an input voltage and provide a regulated output voltage to the rechargeable battery 106. The DC to DC converter 104 may also provide a charging current to the rechargeable battery 106 during a charging mode. In one embodiment, the DC to DC converter 104 may be a buck converter as is known in the art. The DC to DC converter 104 may be controlled by the controller 108 via a control signal provided to the DC to DC converter via path 118. The controller 108 may provide any variety of control signals such as a PWM signal.

The sensor 114 may be any variety of sensors to sense charging current provided to the rechargeable battery 106, e.g., sensor 114 may be a sense resistor in one embodiment where the voltage drop across the sense resistor is proportional to the charging current. A sense amplifier 116 consistent with an embodiment may accept a signal from the sensor 114 and amplify the signal to provide a charging signal (ichg) to the controller 108 representative of the charging current. The controller 108 may also receive a signal from path 122 representative of the voltage level of the rechargeable battery 106. The controller 108 may also provide a battery signal to the sense amplifier 116 via path 124 to inform the sense amplifier 116 whether the rechargeable battery 106 is deeply discharged or not.

Different rechargeable batteries 106 may require differing charging currents under different conditions. For instance, if the rechargeable battery 106 is deeply discharged a small wake-up charging current may be required to avoid stressing the deeply discharged battery. The value of the wake-up charging current may vary with the type of battery and the manufacturer of the battery but may range from 10 milli-Amperes (mA) to 600 mA. For a normally discharged battery, a larger charging current may be provided, e.g., from several hundred milli-Amperes to 1 Ampere depending on the type, manufacturer, and capacity of the battery. For a battery nearing its full capacity, a tapered charging current may be provided that tapers from its larger current value.

Figure 2:
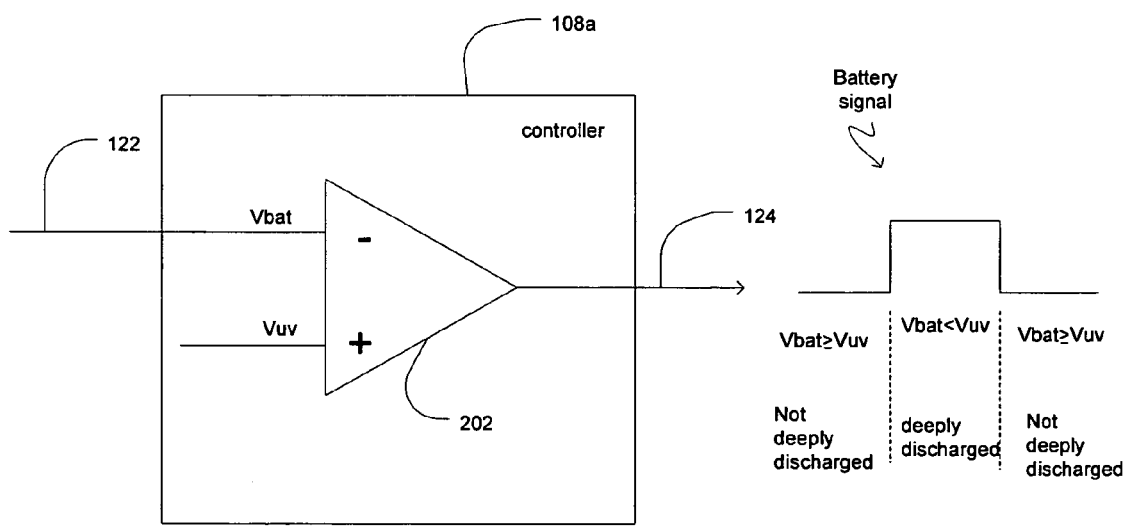
FIG. 2 is a diagram of an embodiment of the controller of FIG. 1.

FIG. 2 illustrates an embodiment 108a of the controller 108 of FIG. 1 showing only that portion of the controller 108a that may provide the battery signal to the sense amplifier 116 via path 124. The battery signal may inform the sense amplifier 116 whether the rechargeable battery 106 is deeply discharged or not. The controller 108a may have a comparator 202 that provides the battery signal. The comparator 202 may receive a signal (Vbat) at its inverting input terminal representative of the voltage level of the rechargeable battery 106, e.g., as may be provided to the controller 108a via path 122. The comparator 202 may also receive a signal representative of the under voltage threshold level (Vuv). The under voltage threshold may be set at a level to detect if the rechargeable battery 106 is deeply discharged. The value of the under voltage threshold level may vary with the battery type, manufacturer of the battery, and rated voltage. In one embodiment, the under voltage threshold level may be approximately 2.4V to 3.0V.

If the battery voltage level is greater than or equal to the under voltage threshold level (Vbat≧Vuv) the battery signal may be in a digital zero state. The battery signal in this state may be representative of the rechargeable battery 106 not being deeply discharged and therefore the rechargeable battery 106 may be charged with a relatively larger charging current. If the voltage level of the rechargeable battery 106 is less than the under voltage threshold level (Vbat<Vuv) the battery signal may be in a digital one state. The battery signal in this state may be representative of the rechargeable battery 106 being deeply discharged and therefore requiring a smaller wake-up charging current.

Figure 3:
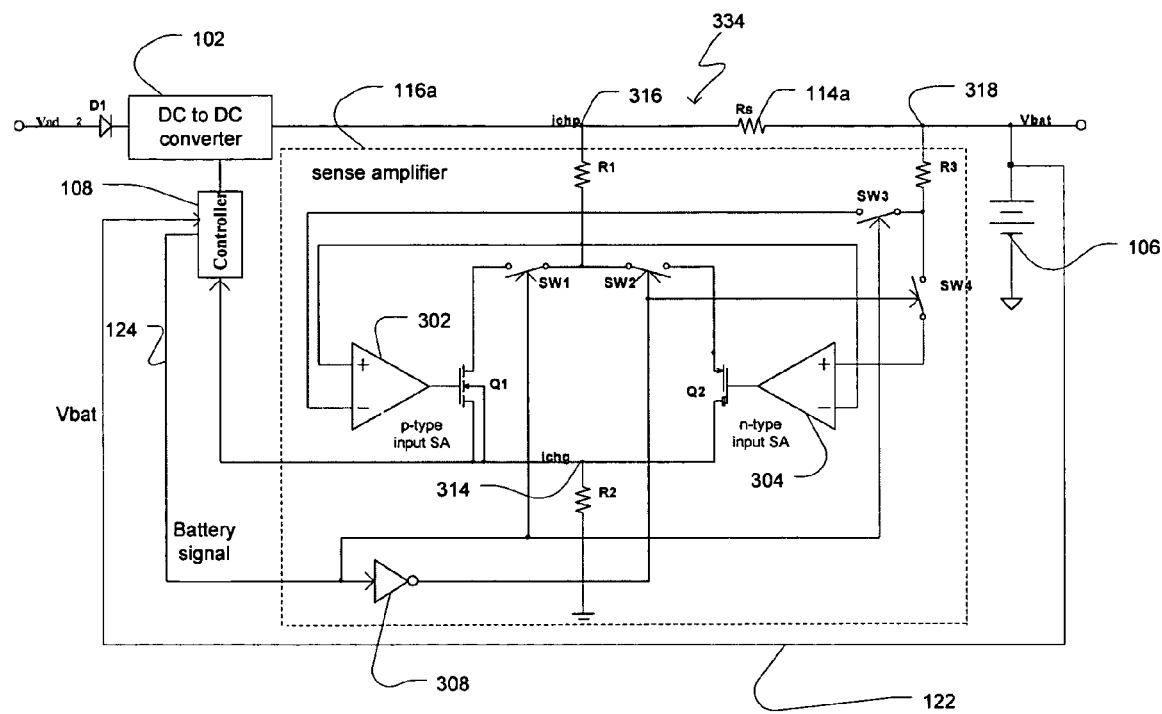
FIG. 3 is a diagram an embodiment of the sense amplifier of FIG. 1.

FIG. 3 illustrates an embodiment 116a of the sense amplifier 116 of FIG. 1. Advantageously, the sense amplifier 116a may provide a charging signal (ichg) to the controller 108 representative of the charging current even if the battery 106 is deeply discharged. The sense amplifier 116a may generally include a p-type input sense amplifier 302, an n-type input sense amplifier 304, a first transistor Q1, a second transistor Q2, a first resistor R1, a second resistor R2, a third resistor R3, an inverter 308, a first switch SW1, a second switch SW2, a third switch SW3, and a fourth switch SW4. A p-type input sense amplifier as used herein may have two symmetrical p-type transistors coupled to an input of the p-type sense amplifier and an n-type sense amplifier as used herein may have two symmetrical n-type transistors coupled to an input of the n-type sense amplifier.

The sense resistor 114a may function as the sensor 114 of FIG. 1. A first node 316 may be coupled to the path 334 between the DC to DC converter 102 and the sense resistor 114a. A second node 318 may be coupled to the path 334 between the sense resistor 114a and the rechargeable battery 106. The noninverting input terminal of the p-type input sense amplifier 302 may be coupled to the first node 316 via the first resistor R1. The inverting input terminal of the p-type input sense amplifier 302 may be coupled to the second node 318 via the third resistor R3 if the third switch SW3 is closed. In contrast, the inverting input terminal of the n-type input sense amplifier 304 may be coupled to the first node 316 via the first resistor R1. The noninverting input terminal of the n-type input sense amplifier 304 may be coupled to the second node 318 via the third resistor R3 if the fourth switch SW4 is closed.

The output of the p-type input sense amplifier 302 may be provided to the control terminal of a first transistor Q1, while the output of the n-type input sense amplifier 304 may be provided to the control terminal of a second transistor Q2. Transistor Q1 may be an n-type metal oxide semiconductor field effect transistor (MOSFET) or NMOS having its gate terminal adapted to receive the output signal from the p-type input sense amplifier 302. The drain terminal of NMOS Q1 may be coupled to the first switch SW1 and the source terminal may be coupled to a reference node 314. Transistor Q2 may be a p-type MOSFET or PMOS having its gate terminal adapted to receive the output signal from the n-type input sense amplifier 304. The source terminal of PMOS Q2 may be coupled to the second switch SW2 and the drain terminal may be coupled to the reference node 314. The second resistor R2 may be coupled between the reference node 314 and ground. The charging signal (ichg) provided to the controller 108 may be a voltage signal at the reference node 314.

In operation, the sense amplifier 116a generally enables the p-type input sense amplifier 302 and disables the n-type input sense amplifier 304 if the battery voltage level of the rechargeable battery 106 is less than the under voltage threshold level, e.g., the battery 106 is deeply discharged. The sense amplifier 116a also generally disables the p-type input sense amplifier 302 and enables the n-type input sense amplifier 304 is the battery voltage level is greater than or equal to the under voltage threshold level, e.g., the battery is not deeply discharged. The charging signal (ichg) may therefore be representative of a wake-up charging current if the battery is deeply discharged and may also be representative of a charging current greater than the wake-up charging current if the battery is not deeply discharged. In this way, the p-type input sense amplifier 302 may be utilized during certain conditions (battery 106 deeply discharged) and the n-input sense amplifier 302 may be utilized during other conditions (battery 106 not deeply discharged) such that the sense amplifier 106a may effectively amplify voltages over a broad rail to rail voltage range (zero volts to a power supply voltage).

If the rechargeable battery 106 is not deeply discharged, the battery signal from the controller 108 may be a digital zero as illustrated in FIG. 2. The output of the inverter 308 may therefore be a digital one. In response, the second and fourth switches SW2 and SW4 may close and the first and third switches SW1 and SW3 may open. Opening the first and third switches SW1 and SW3 effectively disables the p-type input sense amplifier 302 by opening the path input to the inverting input terminal of the p-type input sense amplifier 302 and opening the path coupled to the drain of the NMOS transistor Q1. Closed second and fourth switches SW2 and SW4 effectively enables the n-type input sense amplifier 304 by closing the path to couple the source terminal of PMOS Q2 to the first node 316 and by closing the path to couple the noninverting input terminal of the n-type input sense amplifier 304 to the second node 318. Accordingly, the sense amplifier 116a utilizes the n-type input sense amplifier 304 when the rechargeable battery is not deeply discharged.

If the rechargeable battery 106 is not deeply discharged and the sense amplifier 116a is utilizing the n-input input sense amplifier 304 to provide the charging current signal (ichg) to the controller 108, the charging current may cause a voltage drop across the sense resistor 114a proportional to the charging current. The voltage drop across the sense resistor 114a may then be referenced to ground and amplified according to the resistor ratio R2/R1, where R2 is the second resistor coupled between the reference node 314 and ground, and R1 is the first resistor coupled to the first node 316. In one embodiment, the second resistor R2 may be ten times the value of the first resistor.

If the rechargeable battery 106 is deeply discharged, the battery signal from the controller 108 may be a digital one as illustrated in FIG. 2. The output of the inverter 308 may therefore be a digital zero. In response, the first and third switches SW1 and SW3 may close and the second and fourth switches SW2 and SW4 may open. Opening the second and fourth switches SW2 and SW4 effectively disables the n-type input sense amplifier 304 by opening the path input to the noninverting input terminal of the n-type input sense amplifier 304 and opening the path coupled to the source of the PMOS transistor Q2. Closing the first and third switches SW1 and SW3 effectively enables the p-type input sense amplifier 302 by closing the path to couple the drain terminal of NMOS Q1 to the first node 316 and by closing the path to couple the inverting input terminal of the p-type input sense amplifier 302 to the second node 318. Accordingly, the sense amplifier 116a utilizes the p-type input sense amplifier 302 when the rechargeable battery is deeply discharged.

If the rechargeable battery 106 is deeply discharged and the sense amplifier 116a is utilizing the p-type input sense amplifier 302 to provide the charging current signal (ichg) to the controller 108, the charging current may cause a voltage drop across the sense resistor 114a proportional to the charging current which in this instance may be representative of a wake-up charging current. The voltage drop across the sense resistor 114a may then be referenced to ground and amplified according to the resistor ratio R2/R1.

Figure 4:
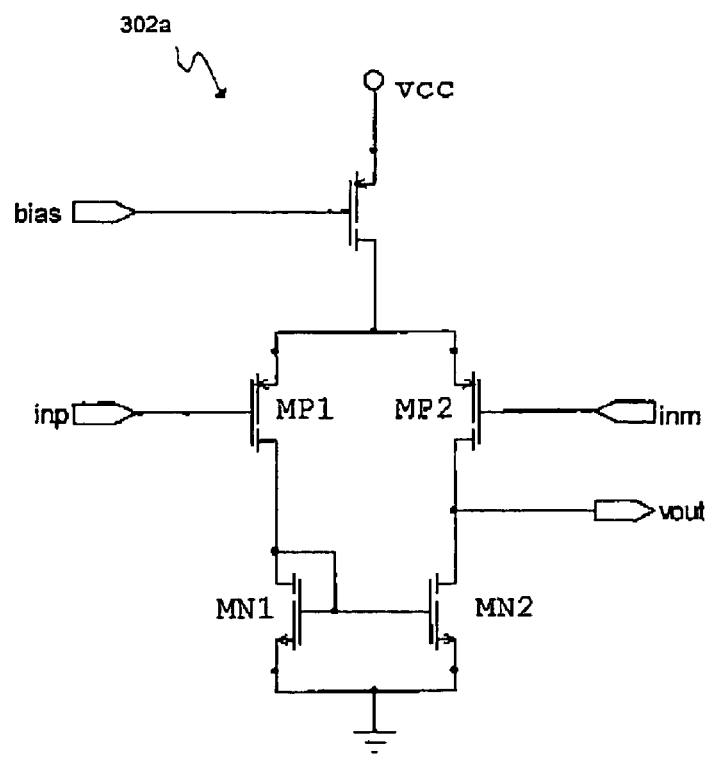
FIG. 4 is a circuit diagram of an embodiment of the p-type input sense amplifier of FIG. 3.

FIG. 4 illustrates an embodiment 302a of a p-type input sense amplifier that may be utilized as the p-type input sense amplifier 302 of FIG. 3. The p-type input sense amplifier may have a pair of symmetrical PMOS transistors MP1, MP2 having their respective gate terminals coupled to respective inputs.

Figure 5:
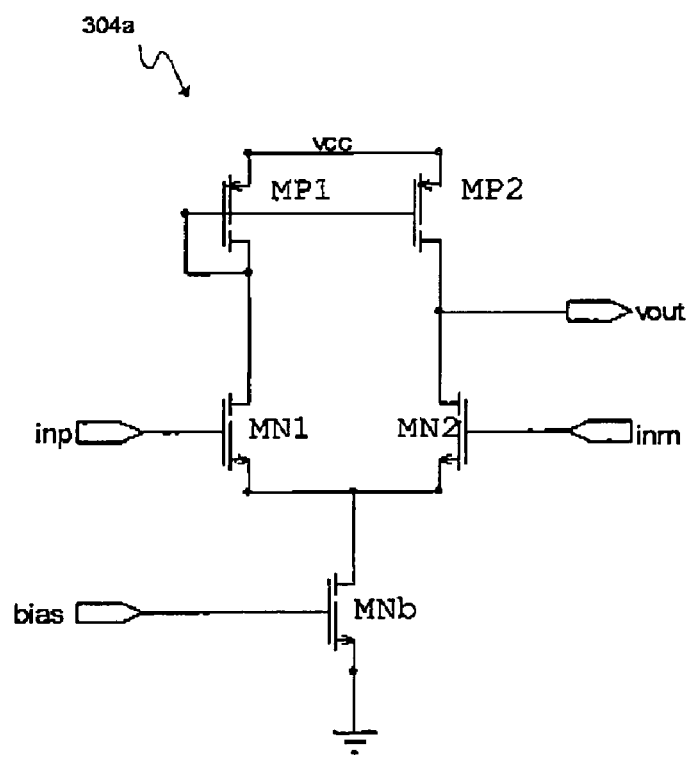
FIG. 5 is a circuit diagram of an embodiment of the n-type input sense amplifier of FIG. 3.

FIG. 5 illustrates an embodiment 304a of an n-type input sense amplifier that may be utilized as the n-type input sense amplifier 304 of FIG. 3. The n-type input sense amplifier may have a pair of symmetrical NMOS transistors MN1 and MN2 having their respective gate terminals coupled to respective inputs.

Figure 6:
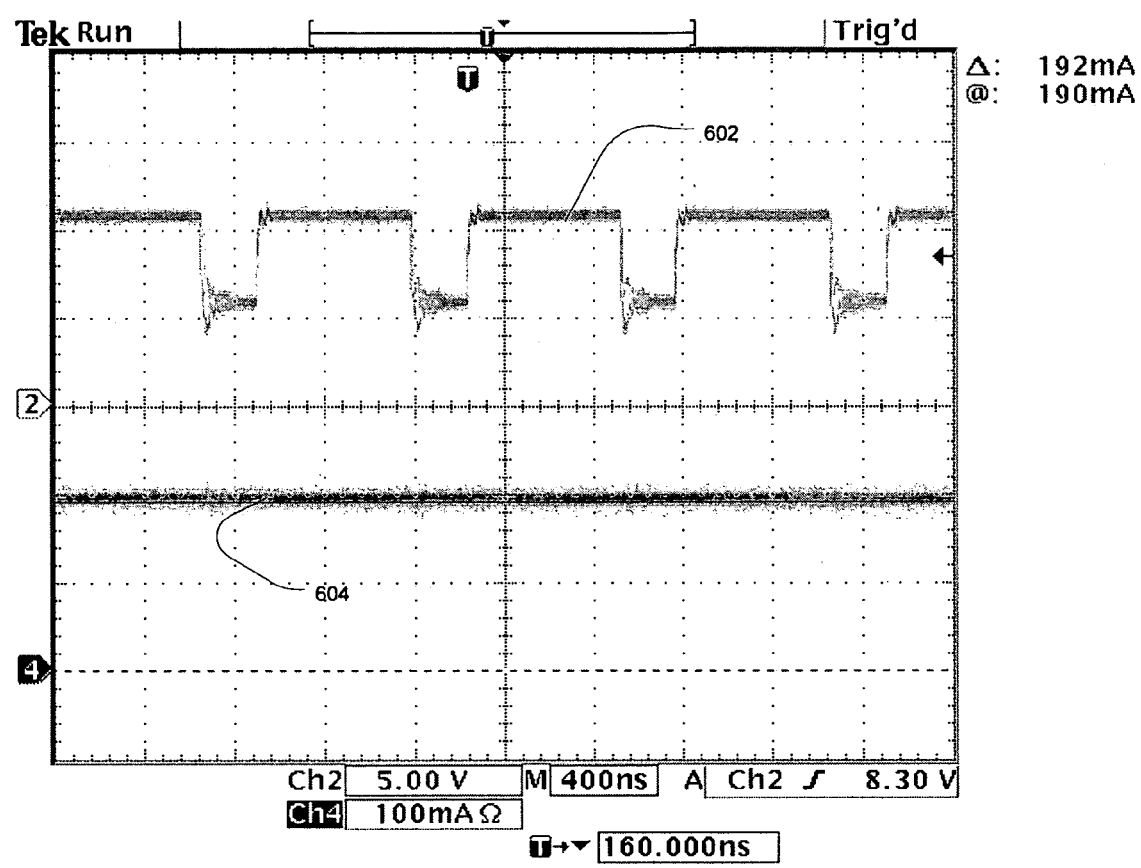
FIG. 6 is a diagram of a test result using the sense amplifier of FIG. 3.

FIG. 6 illustrates a plot of test results utilizing the sense amplifier in the battery charging system of FIG. 3. Plot 602 represents the PWM signal provided by the controller 108 to the DC to DC converter 102 when the battery is deeply discharged and in need of a wake-up charging current. Plot 604 represents the wake-up charging current provided to the rechargeable battery 106. The mean value of the wake-up charging current is about 190 mA, which is only a 5% difference between a targeted wake-up charging current of 200 mA. In addition to this accurate mean value, the wake-up charging current is relatively stable and suffers from less peak-to-peak ripple and noise than present in a conventional wake-up charging current.

Figure 7:
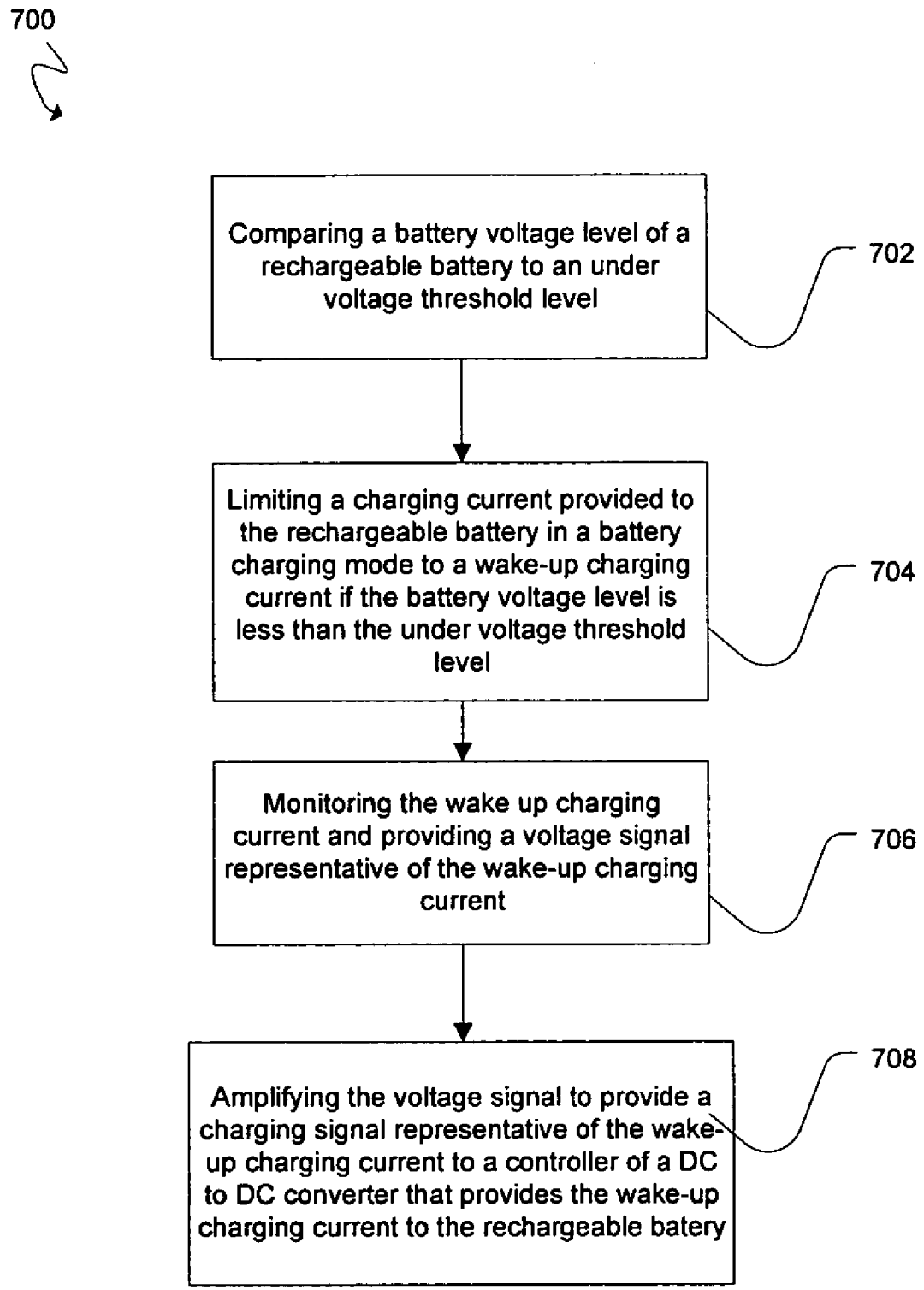
FIG. 7 is a flow chart of operations consistent with an embodiment.

FIG. 7 illustrates operations 700 consistent with an embodiment. Operation 702 may include comparing a battery voltage level of a rechargeable battery to an under voltage threshold level. Operation 704 may include limiting a charging current provided to the rechargeable battery in a battery charging mode to a wake-up charging current if the battery voltage level is less than the under voltage threshold level. Operation 706 may include monitoring the wake-up charging current and providing a voltage signal representative of the wake-up charging current. Finally, operation 708 may include amplifying the voltage signal to provide a charging signal representative of the wake-up charging current to a controller of a DC to DC converter that provides the wake-up charging current to the rechargeable battery.

Thus, in summary, there is provided a sense amplifier adapted to amplify a voltage signal representative of a charging current provided to a rechargeable battery. The sense amplifier may comprise a p-type input sense amplifier and an n-type input sense amplifier. The p-type input sense amplifier may be enabled and the n-type input sense amplifier may be disabled if a battery voltage level of the rechargeable battery is less than an under voltage threshold level. The p-type input sense amplifier may be disabled and the n-type input sense amplifier may be enabled if the battery voltage level is greater than or equal to the under voltage threshold level.

In another embodiment, there is provided an electronic device. The electronic device may comprise a DC to DC converter adapted to provide a charging current via a path to a rechargeable battery. The electronic device may also comprise a controller adapted to compare a voltage level of the rechargeable battery to an under voltage threshold level. The controller may further be adapted to limit the charging current provided by the DC to DC converter to a wake-up current level if the voltage level of the rechargeable battery is less than the under voltage threshold level. The electronic device may further include a sensor coupled to the path to sense a value representative of the charging current. Finally, the electronic device may further include a sense amplifier coupled to the sensor to amplify the value and provide a charging signal representative of the wake-up charging current to the controller when the voltage level of the rechargeable battery is less than the under voltage threshold level.

Advantageously, in these embodiments, the sense amplifier 116a may have rail to rail voltage amplifying capabilities. As such, even if the rechargeable battery is deeply discharged, the sense amplifier may still be able to provide a charging signal to a controller of a DC to DC converter representative of the wake-up charging current. Therefore, the controller may be better able to regulate the wake-up current compared to a conventional system that utilizes a sense amplifier having only an n-type input sense amplifier that is not utilized if the battery is deeply discharged. As such, the regulated wake-up current may have a mean value consistent with a desired value, and may have reduced ripple and noise that may otherwise be present if a sense amplifier utilizing only an n-type input sense amplifier was utilized.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An electronic device comprising:
 a DC to DC converter configured to provide a charging current via a path to a rechargeable battery;
 a controller configured to compare a voltage level of said rechargeable battery to an under voltage threshold level and generate a battery signal to said sense amplifier having a first state if said voltage level of said rechargeable battery is less than said under voltage threshold and a second state if said voltage level of said rechargeable battery is greater than or equal to said under voltage threshold, said controller further configured to limit said charging current provided by said DC to DC converter to a wake-up current level if said voltage level of said rechargeable battery is less than said under voltage threshold level;

a sensor coupled to said path to sense a value representative of said charging current; and a sense amplifier coupled to said sensor to amplify said value and provide a charging signal and configured to receive said battery signal from said controller, said sense amplifier comprising a first switch, a second switch, a third switch, a fourth switch, a p-type amplifier and an n-type amplifier, wherein said first and said third switch are adapted to close and said second and said fourth switch are adapted to open if said battery signal is in said first state such that said n-type amplifier is disabled and said p-type amplifier is enabled and said charging signal is representative of said wake-up charging current if said battery signal is in said first state, and wherein said first and said third switch are adapted to open and said second and said fourth switch are adapted to close if said battery signal is in said second state such that said p-type amplifier is disabled and said n-type amplifier is enabled and said charging signal is representative of a charging current greater than said wake-up charging current if said battery signal is in said second state.

2. The electronic device of claim 1, wherein said sense amplifier further comprises a plurality of switches responsive to said battery signal to enable said p-type input sense amplifier and disable said n-type sense amplifier if said battery signal is in said first state, and to disable said p-type input sense amplifier and enable said n-type input sense amplifier if said battery signal is in said second state.

3. The electronic device of claim 1, wherein said sense amplifier further comprising:

a first transistor of a first type having a control terminal coupled to an output of said p-type input sense amplifier, a terminal coupled to said first switch, and another terminal coupled to a reference node, said reference node providing said charging signal representative of a wake-up charging current if said battery signal is in said first state; and a second transistor of a second type having a control terminal coupled to an output of said n-type input sense amplifier, a terminal coupled to said second switch, and another terminal coupled to said reference node, said reference node providing a charging signal representative of a charging current if said battery signal is in said second state, said charging current greater than said wake-up charging current.

* * * * *